(12) United States Patent
Vadivel et al.

(10) Patent No.: US 11,924,730 B2
(45) Date of Patent: Mar. 5, 2024

(54) OPERATING EMERGENCY PREVENTION SENSOR SYSTEMS

(71) Applicant: Micron Technology, Inc., Boise, ID (US)

(72) Inventors: Shruthi Kumara Vadivel, Boise, ID (US); Anshika Sharma, Boise, ID (US); Deepti Verma, Boise, ID (US); Fatma Arzum Simsek-Ege, Boise, ID (US); Trupti D. Gawai, Boise, ID (US); Lavanya Sriram, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 249 days.

(21) Appl. No.: 17/101,761

(22) Filed: Nov. 23, 2020

(65) Prior Publication Data

US 2022/0167138 A1 May 26, 2022

(51) Int. Cl.

| | |
|---|---|
| *H04W 4/90* | (2018.01) |
| *B64C 39/02* | (2023.01) |
| *G01V 1/00* | (2006.01) |
| *G08B 7/06* | (2006.01) |
| *H04W 4/021* | (2018.01) |
| *H04W 76/50* | (2018.01) |

(52) U.S. Cl.
CPC ............ *H04W 4/90* (2018.02); *B64C 39/024* (2013.01); *G01V 1/008* (2013.01); *G08B 7/066* (2013.01); *H04W 4/022* (2013.01); *H04W 76/50* (2018.02)

(58) Field of Classification Search
CPC ....... H04W 4/90; H04W 4/022; H04W 76/50; H04W 4/021; H04W 4/38; B64C 39/024; G01V 1/008; G08B 7/066; G08B 25/08; G08B 25/10; G08B 21/10; G01D 3/08; G01D 11/00; Y02D 30/70; H04L 67/12; H04L 67/52
USPC .......................... 455/404.1, 321; 370/33, 37
See application file for complete search history.

(56) References Cited

U.S. PATENT DOCUMENTS

| | | |
|---|---|---|
| 5,177,660 A | 1/1993 | Kilner |
| 8,552,861 B2 | 10/2013 | Bastide et al. |
| 9,251,698 B2 | 2/2016 | Vian et al. |
| 10,292,263 B2 | 5/2019 | Rogers et al. |
| 10,777,051 B1 * | 9/2020 | Kumar .................. G08B 7/062 |

(Continued)

FOREIGN PATENT DOCUMENTS

EP 2131160 B1 12/2009

*Primary Examiner* — Michael Y Mapa
(74) *Attorney, Agent, or Firm* — Brooks, Cameron & Huebsch, PLLC

(57) ABSTRACT

Methods, systems, and devices for operating emergency prevention sensor systems are described. Devices can include a plurality of components including a sensor component, a processor, and memory. In an example, a method can include receiving at a processor signaling from a plurality of environmental sensing devices, each having at least one biodegradable component, in an area of concern, wherein the area of concern corresponds to a particular set of coordinates in a database, determining environmental characteristics of an emergency associated with the area of concern based, at least in part, on the signaling, and determining a preventive action based on the determined characteristics. In another example, a number of components of the sensing devices are biodegradable.

18 Claims, 3 Drawing Sheets

(56) References Cited

U.S. PATENT DOCUMENTS

| | | | |
|---|---|---|---|
| 2007/0262863 A1 | 11/2007 | Aritsuka | |
| 2009/0303071 A1* | 12/2009 | Anderson | G01N 33/24 340/693.5 |
| 2016/0009392 A1* | 1/2016 | Korhonen | B64C 39/024 244/137.3 |
| 2017/0006701 A1 | 1/2017 | Casasanta, III | |
| 2018/0074499 A1* | 3/2018 | Cantrell | G05D 1/0094 |

* cited by examiner

OPERATING EMERGENCY PREVENTION SENSOR SYSTEMS

TECHNICAL FIELD

The present disclosure relates to apparatuses, non-transitory machine-readable media, and methods for operating emergency prevention sensor systems.

BACKGROUND

A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can be, or include, a sensing device (e.g., a device with one or more sensors) used to collect data. Data can correspond to environmental conditions local to the sensing device. A plurality of sensing devices can be physically distributed collect data associated with a larger area.

DETAILED DESCRIPTION

Figure 1:
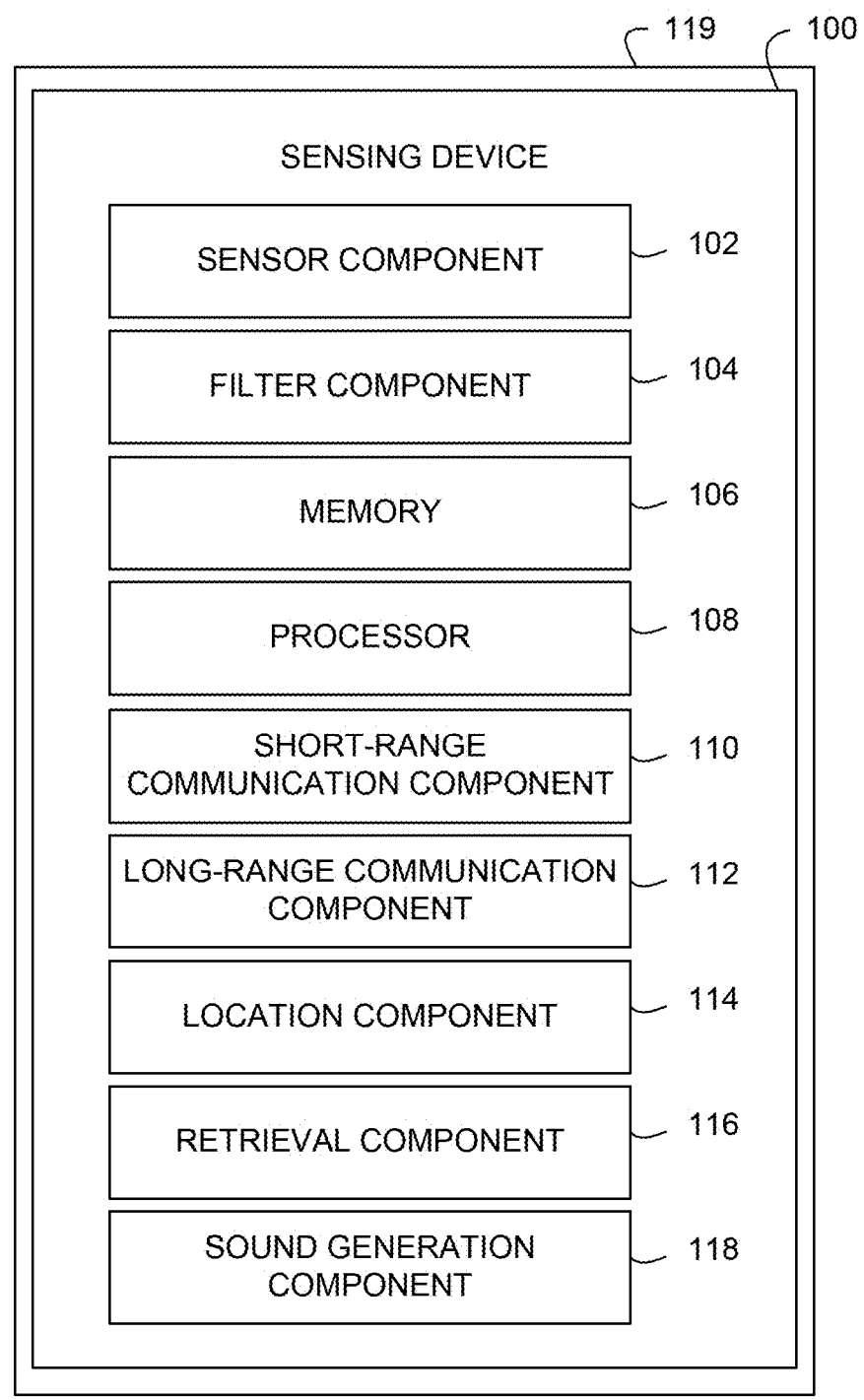
FIG. 1 is a functional block diagram in the form of a sensing device in accordance with a number of embodiments of the present disclosure.

Systems, machine-readable media, and methods related to operating emergency prevention sensor systems are described. An emergency, as referred to herein, is a situation that poses risk to health, life, property, and/or environment. Emergencies can include natural disasters such as fires, earthquakes, volcanic eruptions, storms, etc. Emergencies can include accidents such as chemical releases (e.g., spills, leaks, leachings, etc.), human-caused fires, contaminations, and/or radiation (e.g., nuclear radiation) events. The present disclosure makes reference to an "area of concern" or simply an "area." Such an area is a geographic region that is affected by an emergency (or is likely to be affected by an emergency). In some cases, an area may refer to a portion of a region affected by an emergency. An area may include people, structures, vehicles, plant life, animal life, etc. An area can be defined by coordinates (e.g., coordinates monitored by a host system). An area can be defined by a geolocation fence. An area can correspond to a particular set of coordinates in a database.

Embodiments of the present disclosure can include a network of sensing devices located in an area. In some embodiments, sensing devices can be placed (e.g., distributed) throughout an area by a remote controlled-device, such as an unmanned aerial vehicle (UAV), for instance. The sensing devices can include various sensors. Stated differently, the sensing devices can be configured to sense (e.g., determine) different environmental conditions that may be indicative of an emergency. For example, sensing devices in accordance with the present disclosure can include temperature sensors, carbon monoxide sensors, carbon dioxide sensors, particulate sensors, light sensors, imaging devices (e.g., cameras), humidity sensors, radiation sensors, chemical sensors, and seismic sensors. It is noted that this list is not intended to be exhaustive; the present disclosure is not intended to limit sensing devices to any particular type.

As discussed further below, the sensing devices can be computing devices (e.g., the sensing devices can include a memory and a processor). The sensing devices can communicate with each other. The sensing devices can communicate with a computing device outside of the area (e.g., a remote computing device). The sensing devices can be at least partially biodegradable. In some embodiments, for instance, each sensing device is contained within a biodegradable package that begins to biodegrade when it is placed in an area. In some embodiments, the sensing devices can include a number of components configured to self-destruct. If any components of a sensing device remain after the emergency (e.g., after the emergency is abated and/or mitigated) those components can be retrieved.

Communication between sensing devices and/or additional (e.g., remote) computing devices can yield advantages for embodiments herein over previous approaches. For instance, the sensing devices and/or the computing device can determine a particular location, within the area, of the emergency. The sensing devices and/or the computing device can determine a direction of travel associated with the emergency (e.g., a direction of a spreading fire). Accordingly, embodiments herein can determine preventive actions to take while previous approaches offer reactionary measures. As a result, emergencies can be prevented, mitigated, and/or controlled in some cases. In other cases, people and/or assets can be more effectively evacuated from the area.

Some embodiments of the present disclosure include a method comprising receiving at a processor signaling from a plurality of environmental sensing devices, each having at least one biodegradable component, in an area of concern, wherein the area of concern corresponds to a particular set of coordinates in a database, determining environmental characteristics of an emergency associated with the area of concern based, at least in part, on the signaling, and determining a preventive action based on the determined characteristics. In another example, a number of components of the sensing devices are biodegradable.

Some embodiments of the present disclosure include a system comprising a computing device located outside an area of concern and a plurality of sensing devices configured to be placed in the area of concern, wherein each sensing device is configured to collect data corresponding to an environmental condition local to the sensing device, and wherein each sensing device is configured to communicate with the computing device and other sensing devices of the system. The computing device can be configured to receive the data corresponding to the environmental conditions local to the plurality of sensing devices and determine characteristics of an emergency associated with the area based on the received data.

Yet other embodiments of the present disclosure can include a device comprising a plurality of components, including a sensor component configured to collect data corresponding to an environmental condition in an area, a processor, and a memory having instructions stored thereon which, when executed by the processor, cause the processor to determine an emergency associated with the area based on the data and communicate the determined emergency to another device of a network associated with the area. In such devices, at least one of the plurality of components can comprise biodegradable material.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 100 can reference element "00" in FIG. 1, and a similar element can be referenced as 200 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a sensing device in accordance with a number of embodiments of the present disclosure. As shown in FIG. 1, the sensing device 100 includes a plurality of components. For instance, the sensing device 100 includes a sensor component 102, a filter component 104, a memory 106, a processor 108, a short-range communication component 110, a long-range communication component 112, a location component 114, a retrieval component 116, and a sound generation component 118. It is noted that sensing devices in accordance with the present disclosure are not limited to the components illustrated in FIG. 1. For instance, the sensing device 100 can include additional components such as a battery and/or a charging component (e.g., a solar panel) that are not illustrated in FIG. 1.

The sensor component 102 can collect data corresponding to an environmental condition in an area. The sensor component 102, though illustrated as a single sensor component, can include a number of sensors. The type, character, and/or nature of the sensor(s) of the sensor component 102 is not intended to be limited by the present disclosure. A list of example sensor types that could be included in the sensor component 102 includes temperature sensors, carbon monoxide sensors, carbon dioxide sensors, particulate sensors (e.g., smoke detectors), light sensors, imaging devices (e.g., cameras), humidity sensors, radiation sensors, chemical sensors, and seismic sensors. It is again noted, however, that this list is not intended to be exhaustive; the present disclosure is not intended to limit sensing devices to any particular type and/or number of sensor components. The filter component 104 can filter and/or convert the data collected by the sensor component 102. The filter component 104 can include a number of frequency filters and/or signal converters, for instance.

The memory 106 can store the data collected by the sensor component 102. The memory (e.g., memory resource) 106 can include non-volatile or volatile memory. For example, non-volatile memory can provide persistent data by retaining stored data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random access memory (SRAM), among others. The memory 106, in some embodiments, can include a non-transitory machine-readable medium (MRM).

The memory 106 may be electronic, magnetic, optical, or other physical storage device that stores executable instructions. Thus, the memory 106 may be, for example, a non-transitory MRM comprising Random Access Memory (RAM), an Electrically-Erasable Programmable ROM (EEPROM), a storage drive, an optical disc, and the like. The memory resource 452 may be disposed within a controller and/or computing device. In some embodiments, the executable instructions can be "installed" on the device. Additionally or alternatively, the memory 106 can be a portable, external or remote storage medium, for example, that allows the sensing device 100 to download the instructions from the portable/external/remote storage medium. In this situation, the executable instructions may be part of an "installation package."

The processor 108 can execute instructions stored on the memory 106. Although the description herein refers to a processor and a memory, the descriptions may also apply to a system with a controller or with multiple processing resources and multiple memory resources. In such examples, the instructions may be distributed (e.g., stored) across multiple memory resources and the instructions may be distributed (e.g., executed by) across multiple processing resources.

The short-range communication component 110 allows the sensing device 100 to communicate with additional sensing devices within an area. For example, the short-range communication component 110 can include BLUETOOTH® Low Energy (BLE) technology, WiFi, near field communication, etc. The long-range communication component 112 allows the sensing device 100 to communicate with a computing device outside of the area (e.g., a remote computing device). For example, the long-range communication component can include cellular wireless technologies (e.g., long-term evolution (LTE), SigFox, etc.) and/or radio technologies (e.g., Long Range (LoRa), etc.). Communication between sensing devices and remote computing devices is discussed further below in connection with FIG. 2.

The location component 114 allows the sensing device 100 to determine its location (e.g., its geographic location). In some embodiments, the location component 114 includes a global positioning system (GPS) transceiver. In some embodiments, the sensing device 100 can triangulate and/or trilaterate its location based on communications with other sensing devices. The retrieval component 116 allows the sensing device 100 to be retrieved from an area by a remote controlled and/or autonomous device (e.g., a UAV). For example, the retrieval component can include a hook, a clasp, a linkage, a magnet, etc. The sound generation component 118 can produce audible sounds. For example, the sound generation component can include a loudspeaker, an alarm, a siren, etc.

Portions of the sensing device 100 can be biodegradable. That is, one or more of the sensor component 102, the filter component 104, the memory 106, the processor 108, the short-range communication component 110, the long-range communication component 112, the location component 114, the retrieval component 116, and the sound generation component 118 can be biodegradable. For example, the device 100 can include Si/MgO/Mg transistors, Si diodes, Mg/MgO inductors and/or capacitors, Mg resistors and/or interconnectors, etc. The device 100 can include $Ga_2O_3$/$In_2O_3$/ZnO thin film transistors (TFTs). The device 100 can include Mo and/or $MoS_2$ materials. In some embodiments, the component(s) of the sensing device 100 can include biodegradable substrates such as silk, cellulose, sodium carboxymethylcellulose (Na-CMC) for Zn patterns, Poly lactic-co-glycolic acid (PLGA) substrates for transient circuits, electrospun poly(caprolactone)-poly(glycerol sebacate) (PGS-PCL) sheets, PVA substrates for transient indium-gallium-zinc oxide (A-IGZO) TFTs, chitosans substrates for biodegradable batteries, iron foil substrates for transistor arrays, etc. In some embodiments, the sensing device includes a biodegradable package 119. The package 119 containing the sensing device 100 can be placed in the area 226 and allowed to biodegrade. Later removal of the sensing device 100 can be made easier by the reduced weight of the device without the package 119. In some embodiments, the sensing device includes a self-destruct component. The self-destruct component can be activated to cause or accelerate degradation of one or more of the components of the sensing device 100. In one example, an acid can be released that degrades one or more components of the sensing device 100.

Figure 2:
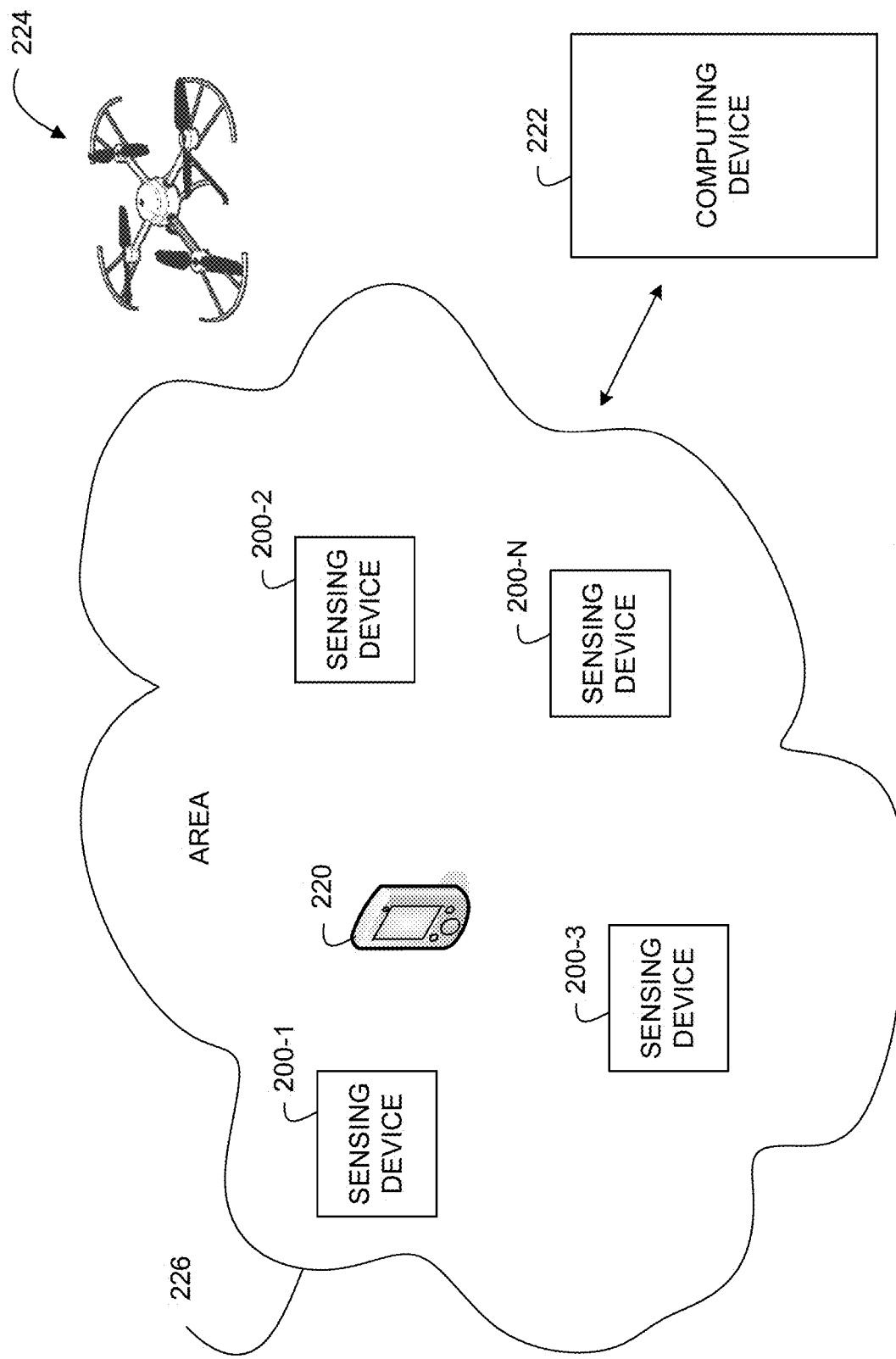
FIG. 2 is a diagram representing a system in accordance with a number of embodiments of the present disclosure.

FIG. 2 is a diagram representing a system in accordance with a number of embodiments of the present disclosure. As shown in FIG. 2, the system includes a plurality of sensing devices 200-1, 200-2, 200-3, 200-N in an area 226. The sensing devices 200-1, 200-2, 200-3, 200-N may be cumulatively referred to as "sensing devices 200." The sensing devices 200 can be placed in the area by a UAV 224, for instance, though embodiments of the present disclosure are not so limited. While four sensing devices 200 are illustrated in the example shown in FIG. 2, the present disclosure does not limit the amount of sensing devices in the area 226.

The sensing devices 200 can communicate with a computing device 222. As shown in FIG. 2, the computing device 222 can be located outside of the area 226 (e.g., remote from the area 226). The computing device 222 can be a remote server, for instance, and can include a memory and a processor, among other components, in a manner analogous to the sensing device 100, discussed above in connection with FIG. 1. Each of the sensing devices 200 can be analogous to the sensing device 100 discussed above and can collect data corresponding to an environmental condition local to the sensing device. In some embodiments, the data is processed by the sensing device that collected it. In some embodiments, the data is communicated to, and processed by, a different one of the sensing devices 200. In some embodiments, the data is communicated to, and processed by, the computing device 222. In addition, the computing device 222 can receive data from outside sources. For example, the computing device 222 can receive weather and/or atmospheric data (e.g., wind speed, wind direction, cloud cover, barometric pressure, etc.). Processing the data collected by the sensing devices 200 and from outside sources can allow the determination of an existing emergency, a potential emergency, and/or the characteristics of an emergency.

If the area 226 is, for example, a forest and the sensing devices 200 are distributed throughout the forest, embodiments herein can determine a particular location, within the forest, of a fire. Further, embodiments herein can determine a direction in which the fire is traveling and/or spreading. Getting this real-time information (e.g., characteristics of the emergency can allow embodiments of the present disclosure to take various preventive actions. For instance, an evacuation plan can be determined based on the characteristics of the emergency. A strategy for mitigating the emergency can be determined. An allocation of emergency response resources (e.g., personnel, vehicles, equipment, materials, etc.) can be determined.

In some embodiments, a mobile device 220, in the path of the fire, can be notified. The mobile device 220 can display a status of the emergency. The mobile device 220 can instruct user(s) to evacuate. In some embodiments, a path for evacuation from the area 226 can be communicated. As previously discussed, the sensing devices 200 can include sound generation components. These components can provide audio alarms and/or instructions to people within the area 226. In some embodiments, the sound generating components can emit a sound that drives animals out of the area 226 (e.g., to a safer area).

Figure 3:
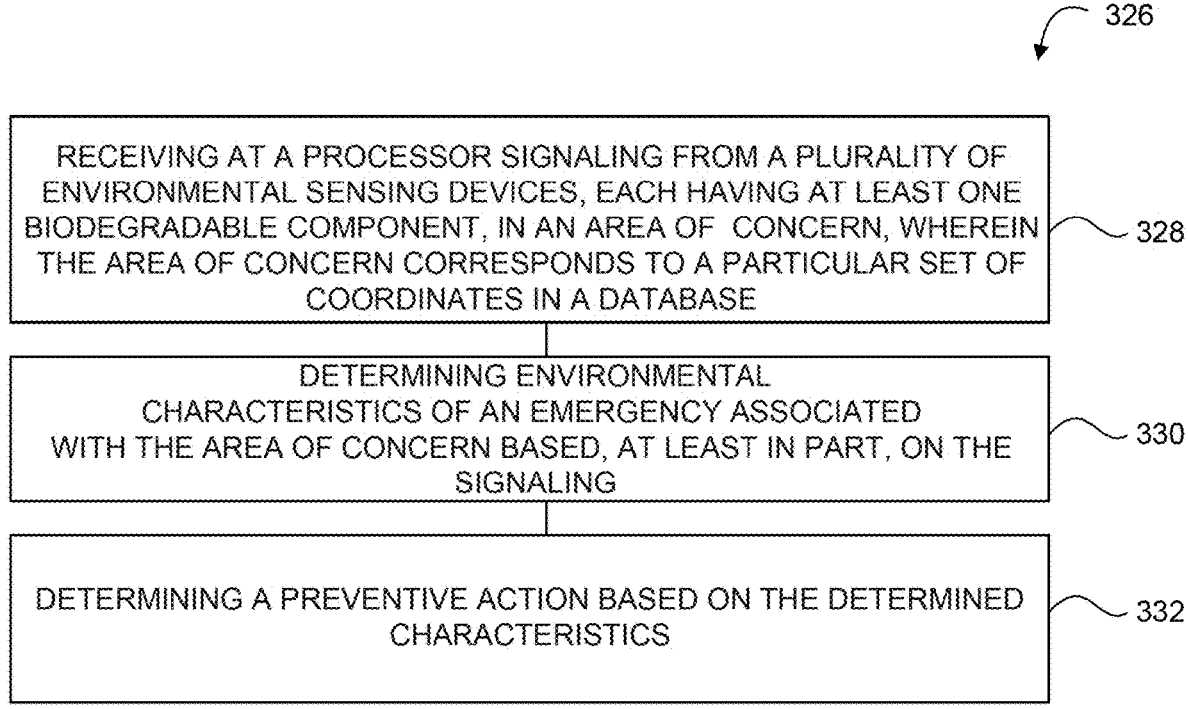
FIG. 3 is a flow diagram representing an example method 326 for operating emergency prevention sensor systems in accordance with a number of embodiments of the present disclosure.

FIG. 3 is a flow diagram representing an example method 326 for operating emergency prevention sensor systems in accordance with a number of embodiments of the present disclosure. The method 326 can be implemented by a computing device, such as a sensing device in an area of concern (e.g., the sensing device 100, previously discussed in connection with FIG. 1) and/or a computing device outside the area (e.g., the computing device 222, previously discussed in connection with FIG. 2).

At 328, the method 326 includes receiving at a processor signaling from a plurality of environmental sensing devices, each having at least one biodegradable component, in an area of concern, wherein the area of concern corresponds to a particular set of coordinates in a database. The signaling (e.g., sensor data) received can be temperature sensor data, carbon monoxide sensor data, carbon dioxide sensor data, particulate sensor data, images, humidity sensor data, radiation sensor data, chemical sensor data, and/or seismic sensor data, among other types of sensor data.

At 330, the method 326 includes determining environmental characteristics of an emergency associated with the area of concern based, at least in part, on the signaling. The characteristics of the emergency can include, for example, a particular location of the emergency, a direction of travel associated with the emergency, a severity of the emergency, and a likelihood that an emerging situation will develop into an emergency.

At 332, the method 326 includes determining a preventive action based on the determined characteristics. Determining a preventive action can include, for example, determining an evacuation plan, determining a mitigation strategy, determining a resource allocation. In some embodiments, preventive actions may be determined responsive to data from a single sensing device. In some embodiments, preventive actions may be determined if a plurality of sensing devices determine characteristics indicative of the existence of an emergency.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving, at a processor, signaling from a plurality of environmental sensing devices, each having at least one biodegradable component, in an area of concern, wherein the area of concern corresponds to a particular set of coordinates in a database;
determining environmental characteristics of an emergency associated with the area of concern based, at least in part, on the signaling;
determining a preventive action based on the determined characteristics, wherein the preventive action includes determining an allocation of emergency response personnel in the area and communicating instructions to the emergency response personnel in the area using a sound generation component of at least one of the plurality of environmental sensing devices;
accelerating a biodegradation of each of the plurality of environmental sensing devices using respective self-destruct components of the plurality of environmental sensing devices; and
removing components of the plurality of environmental sensing devices from the area of concern that did not biodegrade subsequent to the emergency.

2. The method of claim 1, wherein determining characteristics of the emergency includes determining characteristics associated with at least one of: a fire, an earthquake, a volcanic eruption, a storm, a released chemical, a contamination, and a radiation event.

3. The method of claim 1, wherein determining the preventive action includes determining an evacuation plan associated with the area of concern.

4. The method of claim 1, wherein determining the preventive action includes determining a strategy for mitigating the emergency.

5. The method of claim 1, wherein determining the preventive action includes determining an allocation of emergency response resources.

6. The method of claim 1, wherein the method includes allowing the plurality of sensing devices to biodegrade in the area of concern subsequent to the emergency.

7. A system, comprising:
a computing device located outside an area of concern; and
a plurality of at least partially biodegradable sensing devices configured to be placed in the area of concern, wherein each sensing device is configured to collect data corresponding to an environmental condition local to the sensing device, wherein each sensing device is configured to communicate with the computing device and other sensing devices of the system, wherein each sensing device includes a component configured to generate sound, wherein each sensing device includes a respective self-destruct component configured to accelerate a biodegradation of the sensing device, and wherein components of each sensing device that did not biodegrade are configured to be removed from the area of concern subsequent to the emergency; and
wherein the computing device is configured to:
receive the data corresponding to the environmental conditions local to the plurality of sensing devices;
determine characteristics of an emergency associated with the area based on the received data; and
determine an allocation of emergency response personnel in the area; and
wherein each of the plurality of sensing devices is configured to communicate instructions to the emergency response personnel in the area using the component configured to generate sound.

8. The system of claim 7, wherein the system includes an unmanned aerial vehicle (UAV) configured to place the plurality of sensing devices in the area of concern and remove the plurality of sensing devices from the area of concern.

9. The system of claim 8, wherein the UAV is configured to:
place a plurality of biodegradable packages, each including one of the plurality of sensing devices, in the area of concern; and
remove the plurality of sensing devices from the area of concern after the biodegradable packages have biodegraded.

10. The system of claim 7, wherein the computing device is configured to determine a particular location, within the area of concern, of the emergency.

11. The system of claim 7, wherein the computing device is configured to determine a direction of travel associated with the emergency.

12. The system of claim 7, wherein each sensing device is configured to communicate with the computing device via a first communication functionality, and wherein each sensing device is configured to communicate with other sensing devices of the system via a second communication functionality.

13. A device, comprising:
a plurality of components, including:
   a sensor component configured to collect data corresponding to an environmental condition in an area;
   a self-destruct component;
   a processor; and
   a memory having instructions stored thereon which, when executed by the processor, cause the processor to:
      determine an emergency associated with the area and an allocation of emergency response personnel in the area based on the data; and
      communicate the determined emergency to another device of a network associated with the area,
wherein at least one of the plurality of components comprises biodegradable material, and wherein the plurality of components includes a sound generation component configured to communicate instructions to the emergency response personnel in the area;
wherein the self-destruct component is configured to accelerate a biodegradation of the device, and wherein components of the device that did not biodegrade are configured to be removed from the area subsequent to the emergency.

14. The device of claim 13, wherein the sensor component includes at least one of:
a temperature sensor;
a carbon monoxide sensor;
a carbon dioxide sensor;
a particulate sensor;
an imaging device;
a humidity sensor;
a radiation sensor;
a chemical sensor; and
a seismic sensor.

15. The device of claim 13, wherein the device includes a component configured to determine a particular location of the device within the area.

16. The device of claim 13, wherein the plurality of components includes a component configured to allow extraction, by a remote-controlled device, from the area.

17. The device of claim 13 including instructions to communicate the determined emergency to a remote server.

18. The device of claim 13 including instructions to communicate the determined emergency to a mobile device associated with a user in the area.

* * * * *